United States Patent [19]

Kandler

[11] Patent Number: 4,800,852

[45] Date of Patent: Jan. 31, 1989

[54] INLINE COUNTERBALANCE WEIGHT SYSTEM FOR A SINGLE CYLINDER ENGINE

[75] Inventor: William C. Kandler, New Holstein, Wis.

[73] Assignee: Tecumseh Products Company, Tecumseh, Mich.

[21] Appl. No.: 82,961

[22] Filed: Aug. 5, 1987

Related U.S. Application Data

[63] Continuation of Ser. No. 862,312, May 12, 1986, abandoned.

[51] Int. Cl.$^4$ .......................... F02B 75/06; F16F 15/28
[52] U.S. Cl. .................................... 123/192 B; 74/604
[58] Field of Search ....................... 123/192 B, 192 R; 74/603, 604

[56] References Cited

U.S. PATENT DOCUMENTS

| | | | |
|---|---|---|---|
| 1,163,832 | 12/1915 | Lanchester | 74/604 |
| 1,310,090 | 7/1919 | Ricardo | 74/604 |
| 1,595,785 | 8/1926 | Jackson | 74/604 |
| 1,898,459 | 2/1933 | Newcomb | 74/604 |
| 2,183,467 | 12/1939 | Sarazin | 74/604 |
| 2,284,515 | 5/1942 | Criswell | 74/604 |
| 2,406,491 | 8/1946 | Waern | 123/69 R |
| 2,407,102 | 9/1946 | Ryder | 74/604 |
| 2,914,964 | 12/1959 | Bensinger et al. | 74/604 |
| 3,203,274 | 8/1965 | Barth et al. | 74/604 |
| 3,402,707 | 9/1968 | Heron | 123/192 B |
| 3,415,237 | 12/1968 | Harkness | 123/192 B |
| 3,457,804 | 7/1969 | Harkness | 123/192 B |

(List continued on next page.)

FOREIGN PATENT DOCUMENTS

| | | |
|---|---|---|
| 0976822 | 10/1975 | Canada . |
| 0886402 | 7/1949 | Fed. Rep. of Germany . |
| 0969154 | 5/1958 | Fed. Rep. of Germany . |
| 2904066 | 8/1980 | Fed. Rep. of Germany . |
| 0476209 | 12/1952 | Italy . |
| 0722783 | 1/1955 | United Kingdom . |
| 1001077 | 8/1965 | United Kingdom . |

OTHER PUBLICATIONS

Internal Combustion Engines Theory & Design, The McGraw-Hill Book Company, Inc., Vibration and Balancing, p. 458, 1–1945.

Dynamic Balancing of Single Cylinder Diesels by Dr. Ing. Alcide Arlotti, Diesel & Gas Turbine Progress Worldwide, pp. 58–59, 1–1978.

Primary Examiner—Willis R. Wolfe
Attorney, Agent, or Firm—Albert L. Jeffers

[57] ABSTRACT

A single cylinder internal combustion engine has an inline counterbalance weight system which includes a counterbalance shaft rotatably mounted ot a crankcase and extending generally parallel to a crankshaft of the engine and transverse to and aligned with the rectilinear path of reciprocation of the piston pivotally connected to the crankshaft, and a counterbalance weight eccentrically mounted on the counterbalance shaft. The counterbalance shaft and weight are rotated in a direction opposite to the direction of rotation of the crankshaft. The crankshaft and the weights mounted thereon and the counterbalance weight are aligned with and disposed in symmetrical relationship to the rectilinear path of the piston. In such arrangement, vibration imbalance in the engine in the direction of the rectilinear path of the piston is substantially eliminated due to the force vector of the reciprocating piston being generally balanced by the force vectors of the rotating counterbalance weight and the crankshaft and weights thereon when the piston is at opposite end positions of its stroke. Also, the rocking imbalance in the engine is substantially eliminated due to the generally equal displacement of the force vector of the reciprocating piston, the counterbalance weight and the crankshaft and weights thereon from the mounting base defined on the crankcase and the generally balanced relationship of the force vector of the rotating crankshaft and weights thereon with the froce vector of the rotating counterbalance weight when the piston is at an intermediate position between opposite end positions of its stroke.

15 Claims, 4 Drawing Sheets

U.S. PATENT DOCUMENTS

| | | | |
|---|---|---|---|
| 3,528,319 | 9/1970 | Ishida | 74/603 |
| 3,563,222 | 2/1971 | Ishida | 123/192 R |
| 3,763,716 | 10/1973 | Blomberg | 74/604 |
| 3,776,046 | 12/1973 | Jones, Jr. | 74/50 |
| 3,990,325 | 11/1976 | Bueren | 74/604 |
| 4,095,579 | 6/1978 | Iwasa et al. | 123/192 B |
| 4,262,548 | 4/1981 | Haft et al. | 123/192 B |
| 4,290,395 | 9/1981 | Sakano et al. | 123/192 B |
| 4,311,120 | 1/1982 | Freyn et al. | 123/192 B |
| 4,414,934 | 11/1983 | Vogl | 123/192 B |
| 4,509,378 | 4/1985 | Brown | 123/192 B |
| 4,530,255 | 7/1985 | Haslam | 123/192 B |
| 4,569,316 | 2/1986 | Suzuki | 123/192 B |
| 4,574,749 | 3/1986 | Negre | 123/192 B |
| 4,616,608 | 10/1986 | Shiga | 123/192 B |
| 4,664,228 | 5/1987 | Hashigaki et al. | 123/192 B X |

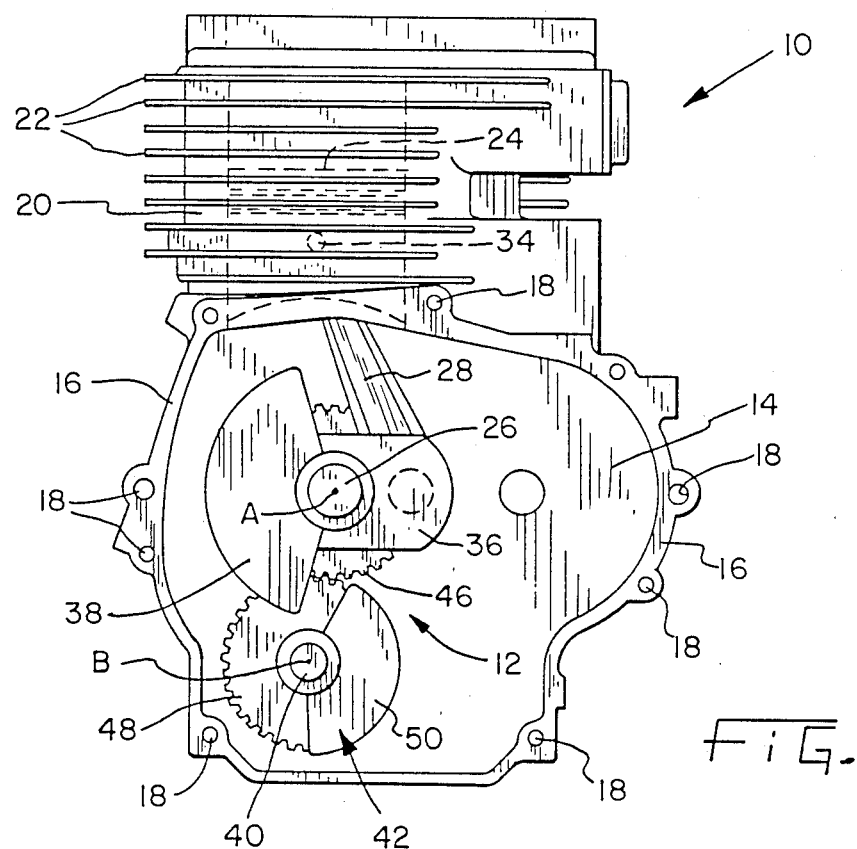
FIG. 1
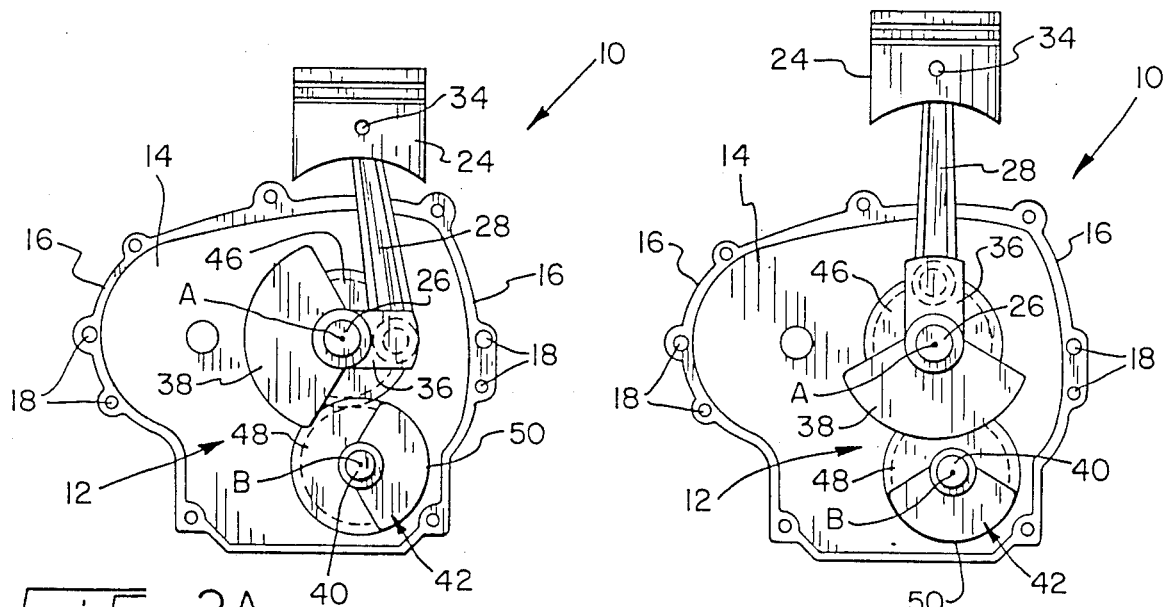
FIG. 2A
FIG. 2B

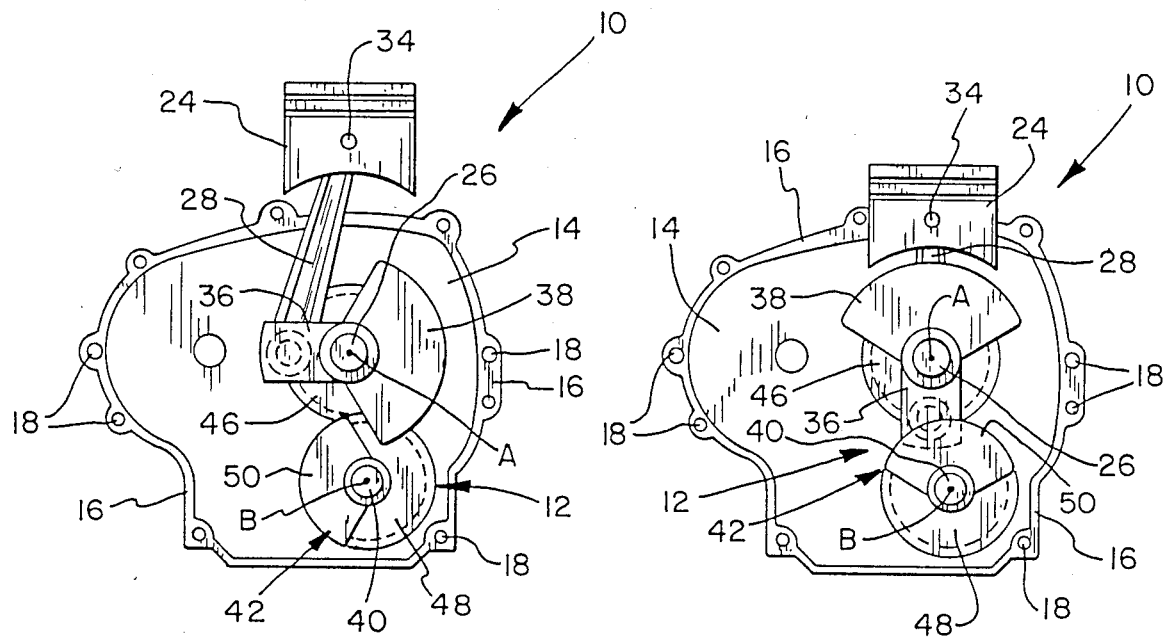
FIG. 2C      FIG. 2D
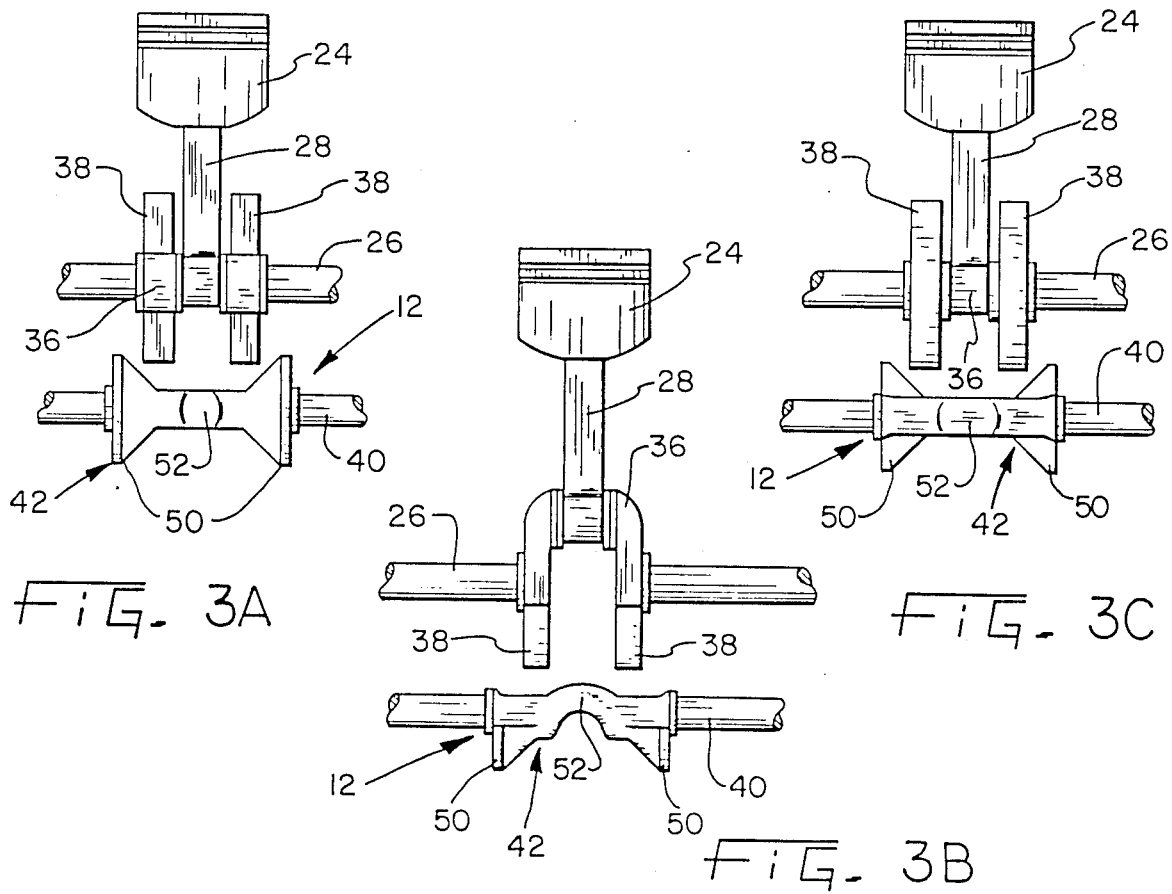
FIG. 3A      FIG. 3C
FIG. 3B

INLINE COUNTERBALANCE WEIGHT SYSTEM FOR A SINGLE CYLINDER ENGINE

This is a continuation of application Ser. No. 862,312, filed May 12, 1986, now abandoned.

BACKGROUND OF THE INVENTION

The present invention generally relates to the counter-balancing of a reciprocating piston, internal combustion engine to eliminate imbalance thereof and, more particularly, is concerned with an inline counterbalance weight system for a single cylinder engine which eliminates vibratory imbalance due to piston reciprocation and crankshaft rotation without introducing rocking couple imbalance about the mounting base of the engine.

A limiting characteristic of a small single cylinder internal combustion engine is the high vibration level created by the engine. Vibrations are inherently generated in such engine, originating from the centerline of its rotation crankshaft and oriented along the line of reciprocating movement of its piston passing through the crankshaft centerline. The vibratory force generated by the engine and transmitted to the operating machine to which the engine is attached and to which it supplies rotary driving power is annoying to the user and can be harmful to the reliability of the machine and shorten its operating life.

Different balancing arrangements are known in the prior art for mounting on a single cylinder engine to provide a balancing force to oppose the vibratory force and thereby substantially reduce or eliminate vibrations incident to the reciprocation of the piston and motion of the crankshaft and other connecting parts of the engine. The approach of one balancing arrangement for a single cylinder engine, such as disclosed in U.S. Pat. No. 2,407,102 to Ryder, is to eccentrically mount a balancing weight on an auxiliary shaft disposed on the engine parallel to its crankshaft and driven from the crankshaft to rotate in an opposite direction. The balancing weight is located intermediate a pair of weights eccentrically mounted on the crankshaft and the auxiliary shaft is displaced laterally from the line of reciprocation of the piston.

In another balancing arrangement for a single cylinder engine, a pair of balancing weights are offset in the same direction from the line of reciprocation of the piston and in opposite directions from the crankshaft. The balancing weights are eccentrically mounted on the engine for rotation about axes which extend generally parallel to the crankshaft. Their direction of rotation is opposite to that of a pair of eccentric weights mounted on the crankshaft. While these balancing arrangements substantially counterbalance and eliminate the vibratory force emanating from the centerline of the crankshaft along the line of reciprocation of the piston, they introduce an undesirable rocking couple about the mounting base of the engine.

Consequently, a need still exists for a balancing arrangement for a single cylinder engine which will eliminate vibratory imbalance due to piston reciprocation and crankshaft and connecting rod rotational motion without substituting other imbalance forces in its place.

SUMMARY OF THE INVENTION

The present invention provides an inline counterbalance weight system for a single cylinder engine designed to satisfy the aforementioned needs. The system meets its objective of eliminating imbalance motion in the engine by a unique arrangement and configuration of the counterbalance weight in conjunction with the crankshaft and the eccentric weights mounted thereon. The arrangement and configuration of the counterbalance weight is one which conserves the volume of additional space needed to accommodate the system by providing a wraparound or nesting relationship between the adjacently positioned rotating components.

Accordingly, the present invention is directed to the combination in a single cylinder internal combustion engine of: (a) a piston reciprocable in the cylinder along a generally rectilinear path; (b) a main, rotatably mounted crankshaft connected to the piston and rotatably driven in a first rotational direction by the piston about an axis extending generally transverse to and in alignment with the rectilinear path of reciprocation of the piston; (c) weight means eccentrically mounted on the crankshaft; (d) a rotatably mounted counterbalance system extending generally parallel to the crankshaft on an opposite side thereof from the piston and also generally transverse to and in alignment with the rectilinear path of reciprocation of the piston; and (e) means driving the counterbalance system in a second rotational direction opposite to the first rotational direction of the crankshaft and in a predetermined timed relationship thereto.

By such arrangement, vibration imbalance in the engine in the direction of the rectilinear path of reciprocation of the piston is substantially eliminated due to the force vector of the reciprocating piston being generally aligned with and balanced by the force vectors of the rotating counterbalance system and the crankshaft and weight means thereon when the piston is at opposite end positions of its stroke. Also, the rocking imbalance in the engine is substantially eliminated due to the force vector of the rotating crankshaft and weight means thereon being generally balanced by the force vector of the rotating counterbalance system when the piston is at an intermediate position between the opposite ends of its stroke.

More particularly, in a preferred embodiment, the counterbalance system includes a rotatably mounted counterbalance shaft extending generally parallel to the crankshaft and transverse to and aligned with the rectilinear path of reciprocation of the piston. In addition, the counterbalance system includes a counterbalance weight eccentrically mounted on the counterbalance shaft and disposed in symmetrical relationship thereon relative to the rectilinear path of reciprocation of the piston. Also, a pair of intermeshing gears interconnect the main and counterbalance shafts and drive the counterbalance shaft in the rotational direction opposite to that of the crankshaft and in the predetermined timed relationship thereto. Preferably, the main crankshaft and the counterbalance shaft are rotated in a one-to-one ratio in the predetermined timed relationship.

Still further, the counterbalance weight has a pair of laterally spaced apart lobes which project toward the crankshaft and overlap with portions thereof during counterrotation of the crankshaft and the counterweight shaft relative to one another. The lobes define a peripheral configuration adapted to receive the portions of the crankshaft in a nesting relationship.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a bottom view of a single cylinder internal combustion engine, with a side plate removed, to expose an inline counterbalance system constructed in accordance with the present invention which is incorporated by the engine.

FIGS. 2a to 2d are top views, from the opposite side of the engine in FIG. 1, of the reciprocating and rotating components of the engine and the counterbalance system at successive positions in one cycle of the engine wherein the piston is halfway along its stroke advancing toward the outer end thereof in FIG. 2a, is at the outer end of its stroke in FIG. 2b, is halfway along its stroke advancing toward the inner end thereof in FIG. 2c, and is at the inner end of its stroke in FIG. 2d.

FIGS. 3a to 3d are fragmentary end elevational views of the reciprocating and rotating components of the engine and the counterbalance system at successive positions in one cycle of the engine corresponding to the positions of FIGS. 2a to 2d.

DETAILED DESCRIPTION OF THE INVENTION

Figure 4:
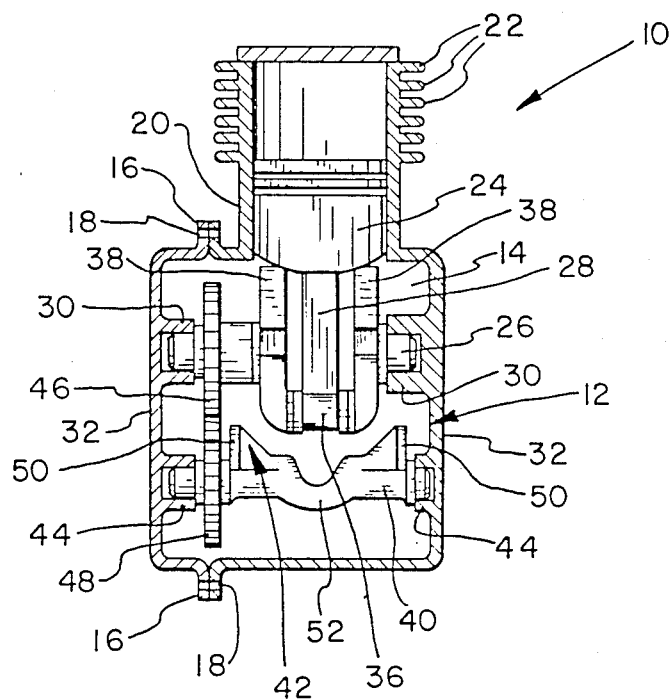
FIG. 4 is an end elevational view of the engine of FIG. 1, on a somewhat smaller scale.

Referring now to the drawings, and particularly to FIGS. 1 and 4, there is shown a single cylinder, reciprocating piston, internal combustion engine, generally designated 10, in which is incorporated the inline counterbalance weight system of the present invention, being indicated by the numeral 12. The engine 10 includes a crankcase 14 having a peripheral flange 16 with holes 18 formed therein. The engine is adapted to be mounted to a machine (not shown), for example the deck of a lawn mower, which will be driven by the rotary power of the engine. The single cylinder 20 of the engine 10 is integral with crankcase 14 and is provided with cooling fins 22.

The engine 10 also includes a cylindrical piston 24, a crankshaft 26 and a connecting rod 28 pivotally interconnecting the piston and crankshaft. The piston 24 is adapted to reciprocate within cylinder 20 along a generally rectilinear path extending horizontally and generally parallel to the flange. The crankshaft 26 is rotatably mounted at its opposite ends by bearings 30 to the opposite sides 32 of the crankcase 14. The connecting rod 28 extends between and pivotally connects a wrist pin 34 in the piston 24 to an eccentric or offset U-shaped arm or throw 36 attached to and extending radially from the crankshaft 26. As piston 24 reciprocates in cylinder 20, it rotatably drives offset throw 36 and the crankshaft 26, for instance in a clockwise direction as viewed in FIGS. 2a to 2d, about an axis A extending generally transverse to and in alignment with the rectilinear path of reciprocation of piston 24. A pair of spaced weights 38 are eccentrically attached to crankshaft 26 and extend radially therefrom opposite to the offset arm 36 for counterbalancing the eccentrically located mass of the arm 36 and part of the reciprocating masses during rotation of the crankshaft 26. Without the provision of some counterbalancing mechanism, the single cylinder engine 10 with the construction as described will vibrate along the path of reciprocation of piston 24 and in a lateral direction.

The inline counterbalance weight system 12 of the present invention will effectively eliminate generation of such vibration in the engine 10 and will do so without introducing other equally undesirable imbalance forces. The counterbalance weight system 12 includes a counterbalance shaft 40 and a counterbalance weight 42 eccentrically attached on the shaft. The counterbalance shaft 40 is rotatably mounted by bearings 44 to the opposite sides 32 of the crankcase 14 so as to extend generally parallel to crankshaft 26 and, along with crankshaft 26, transverse to and in alignment with the rectilinear path of reciprocation of piston 24, the characterization of the system 12 as "inline" derives from the approximately aligned relationship of the counterbalance shaft 40 to crankshaft 26 and the rectilinear path of reciprocation of piston 24, as well as the approximately aligned and symmetrical relationship of the crankshaft offset arm 36 and eccentric weights 38 and the counterbalance weight 42 to the rectilinear path of the piston 24.

The counterbalance shaft 40 is driven off crankshaft 26 by means in the form of intermeshing gears 46,48 respectively keyed to the crankshaft 26 and counterbalance shaft 40. By the drive connection provided by gears 46,48, counterbalance shaft 40 and weight 42 are rotated about an axis B in a direction counter or opposite, such as counterclockwise in FIGS. 2a to 2d, to that of the crankshaft 26 and its offset arm 36 and weights 38. The gears 46,48 are in substantially equal in diameter so as to define the timed relationship between respective rotational cycles of the crankshaft 26 and the counterbalance shaft 40 as unity or in a one-to-one ratio.

FIGS. 2a to 2d illustrate the respective successive positions of the piston 24, connecting rod 28, crankshaft offset arm 36 and eccentric weights 38, and counterbalance weight 42 at successive quarter-turns of the crankshaft 26 and counterbalance shaft 40 in one cycle of the engine 10. The successive positions of these same components are shown in FIGS. 3a to 3d which correspond respectively to those positions shown in FIGS. 2a to 2d.

Figure 5A:
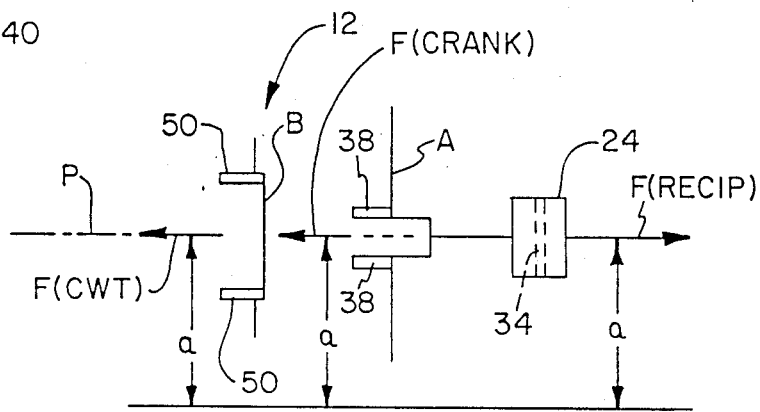
FIGS. 5a to 5c are schematical representations of the reciprocating piston, the rotating crankshaft with eccentric weights attached thereon and the eccentric weights of the counterbalance system, showing the directions of the force vectors associated with each at the outer end position of the piston in FIGS. 5a and 5b which correspond to FIGS. 2b and 3b and at the position of the piston halfway along its stroke advancing toward the inner end thereof in FIG. 5c which correspond to FIGS. 2c and 3c.
Figure 5B:
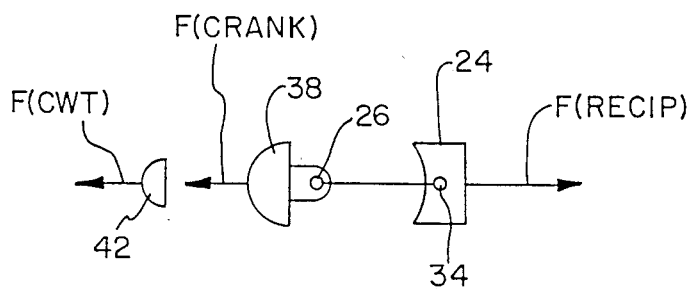
Figure 5C:
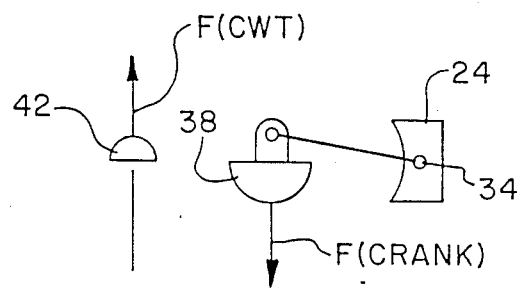

In FIGS. 2a and 3a, the piston 24 is approximately halfway along its rectilinear reciprocatory stroke, advancing toward the top dead center (TDC) position thereof. Crankshaft weights 38 and counterbalance weight 42 are disposed on opposite sides of their respective rotational axes A,B in opposing relationship such that their force vectors $F_{crank}$ and $F_{cwt}$, as illustrated in FIG. 5c, are balanced with respect to one another. In FIGS. 2c and 3c, the piston 24 is at the same position as in FIGS. 2a and 3a, but is now advancing toward the bottom dead center (BDC) of its stroke. The rotating crankshaft weights 38 and counterbalance weight 42 are again disposed in opposing relationship such the their force vectors are balanced with respect to one another, but the positions of the respective weights have been interchanged.

Figure 3D:
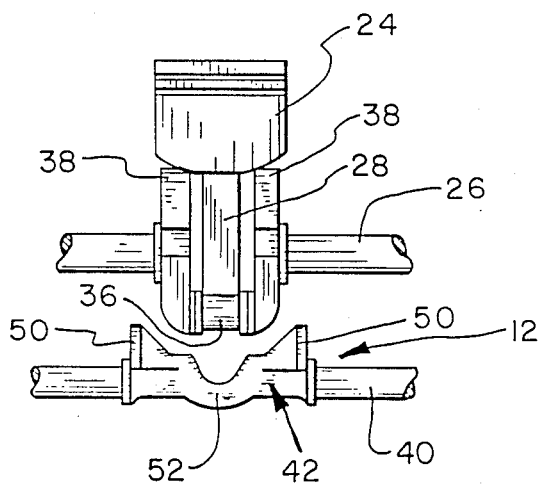

In FIGS. 2b and 3b, the piston 24 is at TDC, whereas in FIGS. 2d, and 3d, it is at BDC. In both instances, the rotating crankshaft weights 38 and the counterbalance weight 42 are disposed on the same sides of their respective rotational axes A,B such that their force vectors are additive with respect to one another and balanced with respect the force vector of the piston. For example in FIGS. 5a and 5b, the force vectors of the crankshaft weights 38 $F_{crank}$ and counterbalance weight 42 $F_{cwt}$ together balance the force vector $F_{recip}$ of the piston. Force vectors $F_{crank}$ and $F_{cwt}$ are coplanar in plane P perpendicular to the axes of crankshaft 26 and counterbalance shaft 40.

In view of the above-described relationships, vibration imbalance in the engine 10 in the direction of the rectilinear path of reciprocation of the piston 24 is substantially eliminated. This is due to the force vector $F_{recip}$ of the reciprocating piston 24 being generally balanced by the force vectors $F_{crank}$ and $F_{cwt}$ of the rotating counterbalance weight 42 and the crankshaft 26 and weights 38 thereon when the piston 24 is at opposite end positions of its stroke. Likewise, rocking imbalance in the engine 10 is substantially eliminated by the counterbalance system 12. This is due to the generally equal diplacement of the force vectors $F_{recip}, F_{cwt}, F_{crank}$ of the reciprocating piston 24, the counterbalance weight 42 and the crankshaft 26 and weights 38 thereon, as represented in FIG. 5a by distance "a", and also due to the generally balanced relationship of the force vector of the rotating crankshaft 26 and weights 38 thereon with the force vector of the rotating counterbalance weight 42 when the piston 24 is at an intermediate position between opposite end positions of its stroke.

As seen in FIGS. 3a to 3d, the counterbalance weight 42 has a peripheral configuration which allows it to rotate in a nesting relationship with the offset arm 36 of the rotating crankshaft 26. More specifically, the counterbalance weight 42 has a pair of laterally spaced apart lobes 50 which project toward the rotating crankshaft 26 during certain portions of the rotation cycle of the counterbalance shaft 40 and overlap with portions of the rotating offset arm 36. The lobes 50 and the section 52 of the shaft 40 extending therebetween define the peripheral configuration adapted to receive portions of the crankshaft 26 in the wraparound or nesting relationship which minimizes the amount of space required to accommodate the counterbalance system 12 in the engine 10 and brings counterbalance weight 42 more in-line with crankshaft weight 38.

The counterbalance system of the present invention and many of its attendant advantages will be understood from the foregoing description and it will be apparent that various changes may be made in the form, construction and arrangement of the parts thereof without departing from the spirit and scope of the invention, material advantages, the form hereinbefore described being merely a preferred or exemplary embodiment thereof.

What is claimed is:

1. In a single cylinder internal combustion engine, the combination comprising:

a piston reciprocable in said cylinder along a generally rectilinear path;

a main, rotatably mounted vertical crankshaft connected to said piston and rotatably driven in a first rotational direction by said piston about an axis extending generally transverse to and in alignment with said rectilinear path of reciprocation of said piston;

weight means eccentrically mounted on said crankshaft, said weight means having a center of rotating mass;

a single counterbalance system rotating about a single axis extending generally parallel to said crankshaft at a side thereof opposite from said piston, said counterbalance system having a center of rotating mass that is aligned along the same plane with the weight means center of mass, said plane being perpendicular to the axes of said crankshaft and counterbalance system; and means driving said counterbalance system in a second rotational direction opposite to said first rotational direction of said crankshaft and in a predetermined timed relationship thereto, for causing vibration imbalance in said engine in the direction of said rectilinear path of reciprocation of said piston to be substantially eliminated due to the force vector of said reciprocating piston being generally aligned with and balanced by the force vectors of said rotating counterbalance system and said crankshaft and weight means thereon when said piston is at opposite end positions of its stroke and causing rocking imbalance in said engine to be substantially eliminated due to the force vector of said rotating crankshaft and weight means thereon being generally balanced by the force vector of said rotating counterbalance system when said piston is at an intermediate position between the opposite ends of its stroke.

2. The engine as recited in claim 1, wherein said counterbalance system shaft extends transverse to and in alignment with said rectilinear path of reciprocation of said piston.

3. The engine as recited in claim 2, wherein said counterbalance system driving means includes intermeshing gears interconnecting said main and counterbalance shafts and driving said counterbalance shaft in said second rotational direction opposite to said first rotational direction of said crankshaft and in said predetermined timed relationship thereto.

4. The engine as recited in claim 3, wherein said main crankshaft and said counterbalance shaft are rotatable in a one-to-one ratio in said predetermined timed relationship.

5. The engine as recited in claim 2, wherein said counterbalance system includes a counterbalance weight eccentrically mounted on said counterbalance shaft and disposed in symmetrical relationship thereon relative to said rectilinear path of reciprocation of said piston.

6. The engine as recited in claim 1, wherein said weight means on said crankshaft includes a pair of spaced weights eccentrically mounted on said crankshaft and disposed in symmetrical relationship thereon relative to said rectilinear path of reciprocation of said piston.

7. The engine as recited in claim 6, wherein said counterbalance system:

extends transverse to and in alignment with said rectilinear path of reciprocation of said piston; and including a counterbalance weight eccentrically mounted on said counterbalance shaft and disposed in symmetrical relationship thereon relative to said rectilinear path of reciprocation of said piston.

8. The engine as recited in claim 7, wherein said counterbalance weight has a peripheral configuration which allows it to rotate in a nesting relationship with portions of said rotating crankshaft.

9. The engine as recited in claim 7, wherein said counterbalance weight has a pair of laterally spaced apart lobes which project toward said crankshaft and overlap with portions thereof during counterrotation of said crankshaft and said counterweight shaft relative to one another, said lobes defining a peripheral configuration adapted to receive said portions of said crankshaft in a nesting relationship.

10. In an internal combustion engine, the combination comprising:
p¹ a crankcase having means defining a mounting base;
a single cylinder in said crankcase;
a piston reciprocable in said cylinder along a generally rectilinear path extending generally parallel to said mounting base;
a main vertical crankshaft rotatably mounted to said crankcase and connected to said piston, said crankshaft being rotatably driven in a first rotational direction by said piston about an axis extending generally transverse to and in alignment with said rectilinear path of reciprocation of said piston;
a pair of spaced weights eccentrically mounted on said crankshaft, said crankshaft and weights having a center of rotating mass;
a single counterbalance shaft rotatably mounted to said crankcase at a side of said crankshaft opposite from said piston and having an axis extending generally parallel to said crankshaft and transverse to and in alignment with said rectilinear path of reciprocation of said piston;
means drivingly interconnecting said main and counterbalance shafts and driving said counterbalance shaft in a second rotational direction opposite to said first rotational direction of said crankshaft and in a predetermined timed relationship thereto; and
a pair of spaced counterbalance weights eccentrically mounted on said counterbalance shaft, said counterbalance weights and shaft having a center of rotating mass;
said crankshaft and counterbalance centers of mass being aligned with each other along a plane that is perpendicular to the axes of said crankshaft and counterbalance shaft and being aligned with and disposed in symmetrical relationship to said rectilinear path of reciprocation of said piston, whereby vibration imbalance in said engine in the direction of said rectilinear path of reciprocation of said piston is substantially eliminated due to the force vector of said reciprocating piston being generally balanced by the force vectors of said rotating counterbalance weight and said crankshaft and weights thereon when said piston is at opposite end positions of its stroke, whereas rocking imbalance in said engine is substantially eliminated due to the generally equal displacement of the force vectors of said reciprocating piston, said counterbalance weight and said crankshaft and weights thereon from said mounting base defined on said crankcase and the generally balanced relationship of the force vector of said rotating crankshaft and weights thereon with the force vector of said rotating counterbalance weight when said piston is at an intermediate position between opposite end positions of its stroke.

11. The engine as recited in claim 10, wherein said counterbalance weight has a peripheral configuration which allows it to rotate in a nesting relationship with portions of said rotating crankshaft.

12. The engine as recited in claim 10, wherein said counterbalance weight has a pair of laterally spaced apart lobes which project toward said crankshaft and overlap with portions thereof during counterrotation of said crankshaft and said counterweight shaft with respect to one another, said lobes defining a peripheral configuration adapted to receive said portions of said crankshaft in a nesting relationship.

13. The engine as recited in claim 10, wherein said main crankshaft and said counterbalance shaft are rotated in a one-to-one ratio in said predetermined timed relationship.

14. In a single cylinder internal combustion engine, the combination comprising:
a piston reciprocable in said cylinder along a generally rectilinear path;
a main, rotatably mounted crankshaft connected to said piston and rotatably driven in a first rotational direction by said piston about an axis extending generally transverse to and in alignment with said rectilinear path of reciprocation of said piston;
weight means eccentrically mounted on said crankshaft, said weight means having a center of rotating mass;
a single counterbalance system rotating about a single axis extending generally parallel to said crankshaft at a side thereof opposite from said piston, said counterbalance system having a center of rotating mass that is aligned along the same plane with the weight means center of mass, said plane being perpendicular to the axes of said crankshaft and counterbalance system; and
means driving said counterbalance system in a second rotational direction opposite to said first rotational direction of said crankshaft and in a predetermined timed relationship thereto, for causing vibration imbalance in said engine in the direction of said rectilinear path of reciprocation of said piston to be substantially eliminated due to the force vector of said reciprocating piston being generally aligned with and balanced by the force vectors of said rotating counterbalance system and said crankshaft and weight means thereon when said piston is at opposite end positions of its stroke and causing rocking imbalance in said engine to be substantially eliminated due to the force vector of said rotating crankshaft and weight means thereon being generally balanced by the force vector of said rotating counterbalance system when said piston is at an intermediate position between the opposite ends of its stroke, said weight means on said crankshaft including a pair of spaced weights eccentrically mounted on said crankshaft and disposed in symmetrical relationship thereon relative to said rectilinear path of reciprocation of said piston, said counterbalance system extending transverse to and in alignment with said rectilinear path of reciprocation of said piston and including a counterbalance weight eccentrically mounted on said counterbalancing shaft and disposed in symmetrical relationship thereon relative to said rectilinear path of reciprocation of said piston, said counterbalance weight having a pair of laterally spaced-apart lobes which project toward said crankshaft and overlap with portions thereof during counterrotation of said crankshaft and said counterweight shaft relative to one another, said lobes defining a peripheral configuration adapted to receive said portions of said crankshaft in a nesting relationship.

15. In an internal combustion engine, the combination comprising:

a crankcase having means defining a mounting base;

a single cylinder attached to said crankcase;

a piston reciprocable in said cylinder along a generally rectilinear path extending generally parallel to said mounting base;

a main crankshaft rotatably mounted to said crankcase and connected to said piston, said crankshaft being rotatably driven in a first rotational direction by said piston about an axis extending generally transverse to and in alignment with said rectilinear path of reciprocation of said piston;

a pair of spaced weights eccentrically mounted on said crankshaft, said crankshaft and weights having a center of rotating mass;

a single counterbalance shaft rotatably mounted to said crankcase at a side of said crankshaft opposite from said piston and having an axis extending generally parallel to said crankshaft and transverse to and in alignment with said rectilinear path of reciprocation of said piston;

means drivingly interconnecting said main and counterbalance shafts and driving said counterbalance shaft in a second rotational direction opposite to said first rotational direction of said crankshaft and in a predetermined timed relationship thereto; and a pair of spaced counterbalance weights eccentrically mounted on said counterbalance shaft, said counterbalance weights and shaft having a center of rotating mass;

said crankshaft and counterbalance centers of mass being aligned with each other along a plane that is perpendicular to the axes of said crankshaft and counterbalance shaft and being aligned with and disposed in symmetrical relationship to said rectilinear path of reciprocation of said piston, whereby vibration imbalance in said engine in the direction of said rectilinear path of reciprocation of said piston is substantially eliminated due to the force vector of said reciprocating piston being generally balanced by the force vectors of said rotating counterbalance weight and said crankshaft and weights thereon when said piston is at opposite end positions of its stroke, whereas rocking imbalance in said engine is substantially eliminated due to the generally equal displacement of the force vectors of said reciprocating piston, said counterbalance weight and said crankshaft and weights thereon from said mounting base defined on said crankcase and the generally balanced relationship of the force vector of said rotating crankshaft and weights thereon with the force vector of said rotating counterbalance weight when said piston is at an intermediate position between opposite end positions of its stroke, said counterbalance weight having a pair of laterally spaced-apart lobes which project towards said crankshaft and overlap with portions thereof during counterrotation of said crankshaft and said counterweight shaft with respect to one another, said lobes defining a peripheral configuration adapted to receive said portions of said crankshaft in a nesting relationship.

* * * * *